United States Patent Office 3,489,256
Patented Jan. 13, 1970

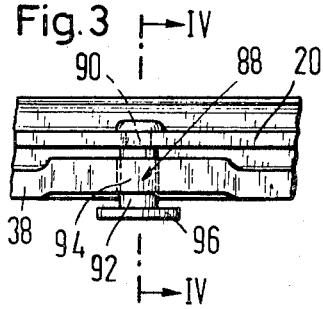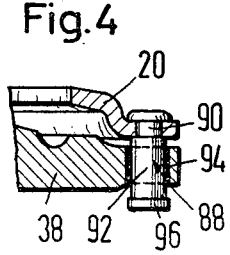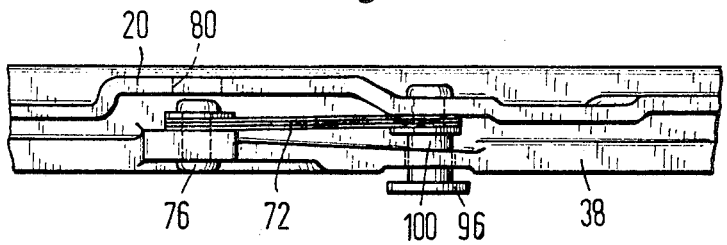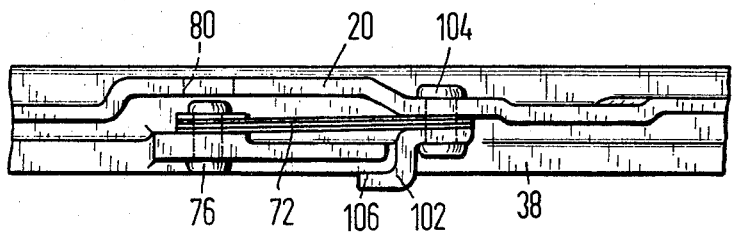

3,489,256
CLUTCH ASSEMBLY FOR AN AUTOMOTIVE VEHICLE
Richard Binder and Kurt Fadler, Schweinfurt, Germany, assignors to Fichtel & Sachs Aktiengesellschaft, Schweinfurt (Main), Germany
Filed Mar. 4, 1968, Ser. No. 710,409
Claims priority, application Germany, Mar. 3, 1967, F 51,707
Int. Cl. F16d 19/00, 23/00, 13/42
U.S. Cl. 192—98                                  9 Claims

ABSTRACT OF THE DISCLOSURE

An automotive friction clutch assembly whose overall axial dimension is held to a minimum by arranging the clutch release bearing in a common radial plane with the diaphragm spring of the clutch, the radially inwardly projecting fingers of the spring engaging a circumferential groove in the outer bearing ring. The spring, when fully relaxed, is conical, and its fingers clear the outer bearing ring. Relaxation of the spring is limited by abutments on the clutch casing, so as to permit installation and removal of the casing, the spring, the release bearing, and of elements supported thereon as an assembled unit.

BACKGROUND OF THE INVENTION

This invention relates to a clutch assembly for automotive vehicles, and particularly to a clutch assembly suitable for installation in a limited space.

Almost all small European motorcars were originally designed for use with manual transmissions for better fuel economy and lower initial cost. These economical factors have become less important in recent years, and automatic features are being incorporated in the power trains of such cars. This invention more specifically relates to a friction clutch assembly of reduced axial length which provides some of the space required for installing a hydraulic torque converter between the engine crankshaft and the clutch of a motorcar without major changes in the design of other car elements.

The clutch arrangement with the improvement of which this invention is most closely concerned has been disclosed in Patent No. 2,073,146, The known apparatus has a clutch disc equipped with friction facings on opposite radial faces. The disc axially slides on the output shaft of the clutch on splines preventing relative angular movement of the disc and shaft. An annular diaphragm spring normally urges a pressure plate axially against the disc to clamp the disc between a driving disc connected to the associated engine and the pressure plate which rotates with the driving disc.

The clutch is released by a ball bearing coaxially arranged with the output shaft of the clutch. The central portion of the diaphragm spring is divided by radial slots into fingers engaged by a tubular extension on the inner ring of the clutch release bearing which itself is offset rearwardly from the clutch disc and membrane spring, and is operated by a fork and linkage connected to the clutch pedal of the car. Axial movement of the release bearing causes the membrane spring to be tilted away from the pressure plate.

The afore-described arrangement occupies a space which is relatively long in the direction of the clutch axis, but the clutch disc and release bearing are quite readily accessible for maintenance or repair work.

The primary object of the invention is the provision of a clutch arrangement operating in the same manner as the known clutch described above, but substantially shorter in an axial direction, yet giving ready access to the clutch disc and to the clutch release bearing, and permitting their simple and convenient installation and removal.

SUMMARY OF THE INVENTION

With these and other objects in view, as will become apparent hereinafter, the invention provides a clutch assembly in which the clutch release bearing, and more specifically the rolling antifriction elements of the same, are radially aligned with the membrane spring in the normal stressed condition of the latter. The inner rim portion of the latter directly engages the outer ring of the bearing when the spring is in its stressed condition, but clears the bearing in the relaxed condition of the spring. The spring is axially interposed between a portion of the clutch casing normally mounted on a disc drivingly connected to the engine an dthe pressure plate, and abutments limit the movement of the pressure plate away from the casing portion in such a manner as to keep the spring in its stressed condition when the clutch assembly is released from the driving disc and the clutch output shaft, whereby the clutch release bearing is secured by the spring to the other elements of the clutch assembly during installation or removal of the clutch assembly.

Other features and additional advantages of this invention will readily become apparent from consideration of the following description of a preferred embodiment of the invention, and of certain modified details thereof, as shown on the appended drawing.

BRIEF DESCRIPTION OF THE DRAWING

In the drawing:
FIG. 3 shows a portion of the apparatus of FIG. 2 in side-elevation as viewed in the direction of the arrow III;
FIG. 4 is a sectional view of the device of FIG. 3 taken on the line IV—IV;
and
FIGS. 5 and 6 illustrate two modifications of the device of FIG. 2 in respective views taken in the direction of the arrow V in FIG. 2.

DESCRIPTION OF THE PREFERRED EMBODIMENT

Figure 1:
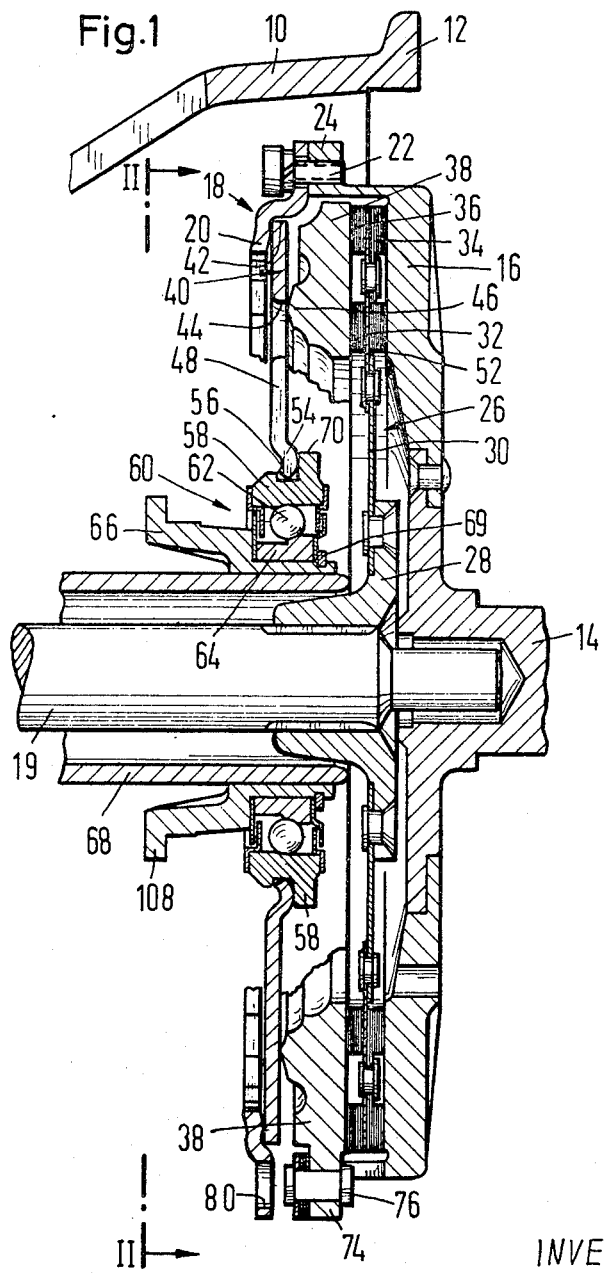
FIG. 1 is a fragmentary side elevational view of an automotive power train including the clutch assembly of the invention, in section on the line I—I in FIG. 2.

Referring now to the drawing in detail, and initially to FIG. 1, there is seen a portion of the power train of a motorcar equipped with a hydraulic torque converter ahead of the illustrated, pedal-operated clutch arrangement, and with a manually operated gear box after the clutch arrangement. The drawing only shows a portion 10 of the gear box housing, and a flange 12 by means of which the gear box is attached to the non-illustrated housing of the torque converter in a conventional manner. The output shaft 14 of the torque converter carries a driving disc 16.

The clutch assembly 18 normally transmits power from the driving disc 16 to the input shaft 19 of the gear box. The assembly includes an annular casing 20 coaxially attached to the driving disc 16 by six screws 22 engaging corresponding lugs 24 equiangularly distributed on the periphery of the driving disc. A clutch disc 26 has a hub portion 28 axially slidable on splines 29 of the shaft 19, but secured by the splines against angular movement relative to the shaft. A flat, annular web 30 connects the hub 28 to the circumferential portion 32 of the clutch disc 26 which carries friction facings 34, 36 on opposite radial faces respectively directed toward the driving disc 16 and an annular pressure plate 38.

The pressure plate is normally urged axially toward the driving disc 16 by a diaphragm spring 40 which is almost flat in a radial plane when in the illustrated stressed condition, but assumes a frustoconical shape when relaxed. The radially outer rim portion 42 of the spring 40 axially abuts against the casing 20. The radially intermediate portion 44 of the spring 40 pivotally bears on an annular projection 46 of the pressure plate 38, and the inner rim portion 48 of the spring has a multiplicity of equiangularly spaced radial slots which divide the rim portion 48 into radial fingers 50 as is better seen in FIG. 2. In the illustrated engaged position of the clutch, the spring 40 urges the pressure plate 38 and the clutch disc 26 toward an annular, axially fixed engagement face 52 of the driving disc 16.

The portions of the clutch assembly 18 described so fat are basically conventional, and their operation is too well understood to require explanation.

The free inner ends 54 of the fingers 50 are received in a circumferential, annular groove 56 formed in the outer bearing ring 58 of a clutch release bearing 60 whose spherical antifriction elements 62 and the associated ball races are located in the radial plane of the spring 40. The inner bearing ring 64 is axially secured on a coaxial sleeve 66 by an annular spring clip 69. The sleeve 66 is slidably mounted on a tubular projection 68 of the gear box housing 10 about the shaft 19.

The clutch is disengaged by moving the sleeve 66 toward the left, as viewed in FIG. 1, whereby an integral radial flange 70 on the outer bearing ring 58 exerts sufficient pressure on the free ends 54 of the finger 50 to lift the spring from the projection 46 of the pressure plate 38. The sleeve is moved by a non-illustrated fork of a clutch pedal linkage, the fork engaging two opposite lugs 108 of the sleeve 66.

Figure 2:
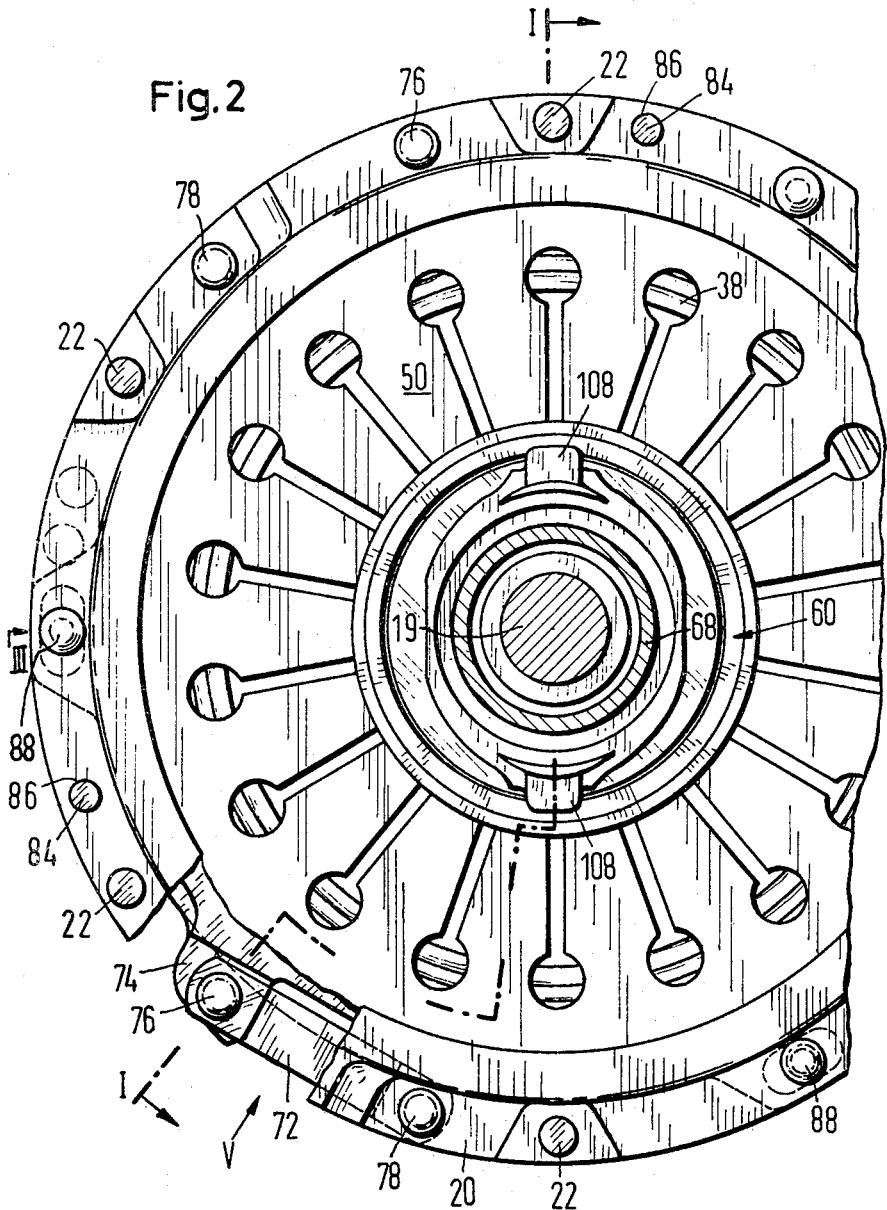
FIG. 2 illustrates the apparatus of FIG. 1 in rear-elevational section on the line II—II in FIG. 1.

As is better seen in FIG. 2, the pressure plate 38 is attached to the casing 20 by three leaf springs 72 elongated tangentially relative to a common circle about the clutch axis whose diameter is greater than that of the spring 40. One end of each spring 72 is attached to a radial boss 74 of the pressure plate 38 by a rivet 76 whereas the other end is fastened to the casing 20 by a rivet 78, access to each rivet 76 for assembly purposes being had through an axial bore in the casing 20 (FIG. 1).

Mounting of the clutch assembly 18 on the driving disc 16 is facilitated by locating pins 84 on the disc which are slidably received in axial bores 86 in the casing 20.

The clutch assembly 18 is removed and installed as a unit including the bearing 60 and the sleeve 66, but not necessarily including the clutch disc 26. When the screws 22 are removed, and the gear box housing 10 and the driving disc 16 of the torque converter are moved axially apart, the sleeve 66 together with the bearings 60, the spring 40, the casing 20, and the pressure ring 38 may be slipped from the projection 68 while the clutch 26 is simultaneously removed from the shaft 19, or after the disc has been removed.

The spring 40 is held in the illustrated stressed condition by three abutment pins 88 of which two are seen in FIG. 2, and one is shown in more detail in FIGS. 3 and 4. One end 90 of each pin 88 is riveted to the casing 20. The shaft 92 of the pin is received with ample clearance in a bore 94 of the pressure plate 38, and the enlarged head 96 of the pin 88 limits axial movement of the plate away from the casing 20.

The pins 88 have a dual function. They prevent the much stronger diaphragm spring 40 from excessively deforming the leaf springs 72 when the clutch assembly 18 is moved away from the face 52 of the driving disc 16. If the spring 40 were permitted to assume its relaxed, frustoconical shape, the free ends 54 of the fingers 50 would move toward the right, as viewed in FIG. 1, and would be spread apart so as to clear the outer bearing ring 58. By limiting the spring 40 to a shape not much different from the planar shape shown in FIG. 1, the abutment pins prevent spontaneous separation of the clutch release bearing 60 from the other elements of the clutch assembly.

Modified abutments for holding the pressure plate 38 to the casing 20 are shown in FIGS. 5 and 6. A rivet 100 which replaces the afore-described rivet 78 in the modified arrangement of FIG. 5 is extended through a bore of the pressure plate 38 and carries the head 96. As is shown in FIG. 6, a Z-shaped bracket 102 may be attached to the casing 20 by the same rivet 104 which also fastens the leaf spring 72 to the casing. The free end 106 of the bracket 102 passes through a bore in the pressure plate 38 and is offset circumferentially to restrain the pressure plate.

What is claimed is:

1. A clutch assembly for a friction clutch comprising, in combination:
   (a) a clutch casing having an axis;
   (b) a pressure plate extending about said axis;
   (c) fastening means fastening said pressure plate to said casing for axial movement relative thereto;
   (d) a diaphragm spring interposed between said casing and said pressure plate,
      (1) said spring being annular about said axis and assuming a substantially frustoconical shape when in the relaxed condition,
      (2) said spring having a radially outer rim portion abuttingly engaging said casing, a radially inner rim portion, and a portion radially intermediate said rim portions and normally abuttingly engaging said pressure plate to urge the same axially away from said casing;
   (e) abutment means limiting axial movement of the pressure plate away from said casing and thereby holding said spring in a stressed condition in which the spring extends substantially in a plane radial relative to said axis; and
   (f) a clutch release bearing coaxial with said casing,
      (1) said bearing having an outer race member, an inner race member, and a plurality of antifriction elements in simultaneous rolling engagement with said race members,
      (2) said bearing being arranged in said radial plane, and
      (3) said outer race member engaging said inner rim portion in said stressed condition of said spring and being dimensioned to clear said inner rim portion in the relaxed condition of said spring.

2. An assembly as set forth in claim 1, wherein said antifriction elements are radially aligned with said spring in said plane.

3. An assembly as set forth in claim 1, wherein said inner rim portion is radially slotted to constitute a plurality of finger portions having free end portions adjacent said axis, said outer race member being formed with an annular circumferential groove receiving said free end portions.

4. An assembly as set forth in claim 3, wherein said finger portions have respective radial faces directed axially toward said pressure plate, and said outer race member has a radial flange axially engaging said faces.

5. An assembly as set forth in claim 1, wherein said fastening means include a leaf spring elongated tangentially relative to a circle about said axis having a diameter greater than the diameter of said spring in said stressed condition of the same, and attaching means respectively attaching the two longitudinal ends of said leaf spring to said casing and to said pressure plate.

6. An assembly as set forth in claim 5, wherein said abutment means is integral with one of said attaching means.

7. In an automative friction clutch including a driving disc member rotatable about an axis, an output shaft coaxial with said disc member, a clutch casing releasably fastened to said disc member for rotation therewith, a pressure plate secured to said casing for axial movement toward and away from said driving disc member, a clutch disc secured on said output shaft against rotation and axially interposed between said pressure plate and driving disc member, a diaphragm spring operatively interposed between said casing and said pressure plate for normally moving said plate toward said disc member and for thereby clamping said clutch disc between said pressure plate and said disc member, and an axially movable clutch release bearing coaxial with said casing and connected to the diaphragm spring for lifting the same from said plate in response to axial movement of said bearing, the improvement which comprises:

(a) abutment means limiting the axial movement of said pressure plate away from said casing and thereby holding the spring in a stressed condition in which the spring extends substantially in a radial plane relative to said axis, the spring being frustoconical when in the relaxed condition;

(b) said bearing extending in said plane and having an outer race member;

(c) said spring having a radially inner rim portion engaging said outer race member for joint movement therewith in said stressed condition of the spring, the outer race member being dimensioned to clear said rim in the relaxed condition of the spring.

8. In a clutch as set forth in claim 7, said bearing having an inner race member and a plurality of antifriction elements radially interposed between said race members in simultaneous rolling engagement therewith, said antifriction elements being radially aligned with a portion of said spring.

9. In a clutch as set forth in claim 7, a tubular support member coaxially surrounding said shaft, said bearing being axially slidable on said support member.

References Cited

UNITED STATES PATENTS

| | | | |
|---|---|---|---|
| 2,076,425 | 4/1937 | Brock | 192—70.3 |
| 2,253,344 | 8/1941 | Nutt et al. | 192—70.18 |
| 2,541,611 | 2/1951 | Reed. | |
| 3,221,856 | 12/1965 | Phelps | 192—70.18 XR |

BENJAMIN W. WYCHE, III, Primary Examiner

U.S. Cl. X.R.

192—89, 70.18